United States Patent [19]
Utsumi et al.

[11] 4,351,282
[45] Sep. 28, 1982

[54] IGNITION TIMING CONTROL SYSTEM FOR INTERNAL COMBUSTION ENGINE

[75] Inventors: Hiroo Utsumi, Kariya; Yukio Sakakibara, Anjo; Teruyoshi Ito, Kariya; Toshiharu Iwata, Aichi; Takashi Yamada, Nishio, all of Japan

[73] Assignee: Nippondenso Co., Ltd., Kariya, Japan

[21] Appl. No.: 284,944

[22] Filed: Jul. 20, 1981

[30] Foreign Application Priority Data

Jul. 22, 1980 [JP] Japan .................. 55/104342[U]

[51] Int. Cl.³ .......................... F02B 3/00; F02P 5/00
[52] U.S. Cl. ................................. 123/425; 123/435
[58] Field of Search ............................. 123/425, 435

[56] References Cited

U.S. PATENT DOCUMENTS 4,240,388 12/1980 Omori ..................... 123/425
4,276,861 7/1981 Kearney ................... 123/425
4,300,503 11/1981 Deloris .................... 123/425

Primary Examiner—Ronald B. Cox
Attorney, Agent, or Firm—Cushman, Darby & Cushman

[57] ABSTRACT

An ignition timing control system for an internal combustion engine includes a knocking reference level generator having an operational amplifier. The operational amplifier receives at its inverting terminal a filtered knock signal and produces a half-wave signal through a diode. The half-wave output signal of the diode is fed back to the inverting terminal of the operational amplifier through a feedback parallel circuit of a resistor and a capacitor.

4 Claims, 3 Drawing Figures

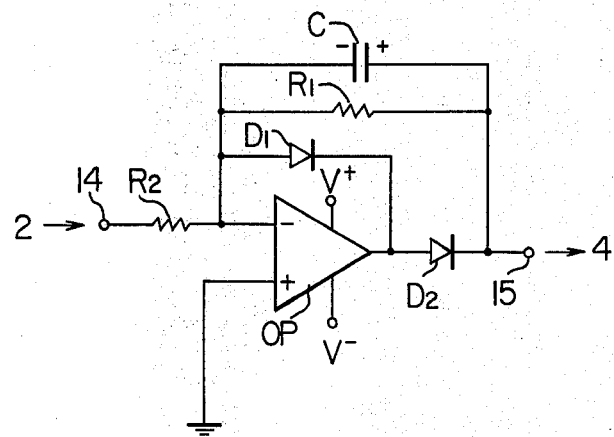
F I G. 3

IGNITION TIMING CONTROL SYSTEM FOR INTERNAL COMBUSTION ENGINE

BACKGROUND OF THE INVENTION

The present invention relates to an ignition timing control system for an internal combustion engine in which the output of the internal combustion engine is improved by controlling the ignition timing according to knockings.

A configuration of an ignition timing control system for controlling the ignition timing in accordance with knockings is shown in FIG. 1. The ignition timing control system shown in this diagram comprises a knocking sensor 1 for detecting a knocking, a filter 2 for selectively passing the knocking component of the output frequency produced from the knocking sensor 1, a knocking decision level generator circuit 3 for generating a knocking decision level, a comparator circuit 4 for comparing the knocking decision level 6 with the output of the filter 7 thereby to make a decision on the knocking and an ignition timing control circuit 9 for controlling the ignition timing in accordance with the output signal of the comparator circuit 4.

A conventional knocking decision level generator circuit 3, as shown in FIG. 2, comprises an amplifier circuit 12 for amplifying the output of the filter 2, a half-wave rectifier circuit 10 for half-wave rectifying the output of the amplifier circuit 12, and an integrator circuit 11 for integrating the output of the half-wave rectifier circuit 10. The DC output of the integrator circuit 11 is applied as a knocking decision level to the comparator circuit 4. This knocking decision level generator circuit 3 enables the setting of a reference level for the comparator circuit 4 corresponding to the noise components of the output of the filter 2, so that an output 8 substantially corresponding to the knock component among the outputs of the filter 2 is obtained from the comparator circuit 4.

In this conventional ignition timing control system, the knocking decision level generator circuit 3 includes the amplifier 12, the half-wave rectifier circuit 10 and the integrator circuit 11, each including an operational amplifier, resulting in an increased number of circuit component elements. This increases not only the product cost but also the number of points causing an offset, a temperature drift of the operational amplifiers or other errors, thereby making it difficult to generate an accurate knocking decision level.

SUMMARY OF THE INVENTION

The present invention has been developed in order to obviate the above-mentioned disadvantages and an object thereof is to provide simple and low-cost means for providing an accurate knocking decision level by an integral configuration of the half-wave rectifier, the integrator and the amplifier.

BRIEF DESCRIPTION OF THE DRAWINGS

FIG. 3 is a detailed electrical circuit diagram showing an embodiment of a knocking decision level generator circuit according to the present invention.

DESCRIPTION OF THE PREFERRED EMBODIMENTS

Figure 1:
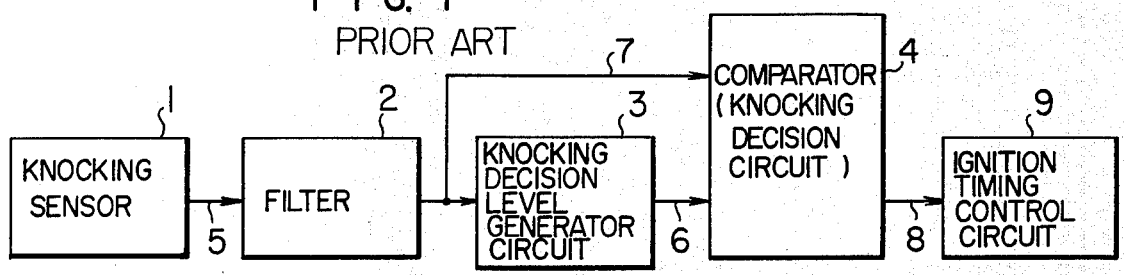
FIG. 1 is a block diagram showing an example of the general configuration of an ignition timing control system according to the prior art and the present invention.
Figure 2:
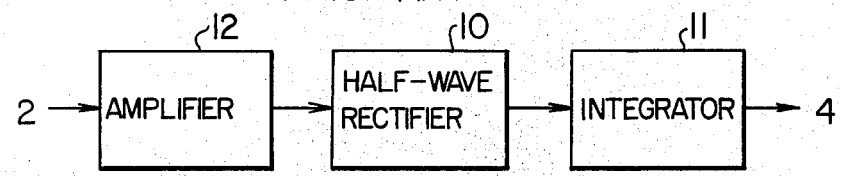
FIG. 2 is a block diagram showing an example of a conventional knocking decision level generator circuit.

An embodiment of the present invention shown in the drawings will be described. The ignition timing control system to which the present invention is applicable has the same general configuration as the one shown in FIG. 1. The diagram of FIG. 3 shows an example of the circuit according to the present invention in which the half-wave rectification, integration and amplification in the knocking decision level circuit 3 of the ignition timing control system are operatively integrated. This circuit includes an operational amplifier OP with the power terminal impressed with a positive voltage $V^+$ and the negative voltage $V^-$ and the non-inverting input thereof grounded, an input resistor R2 inserted between the inverting input of the operational amplifier OP and the input terminal 14 connected to the filter 2, a diode D2 inserted between the output of the operational amplifier OP and the output terminal 15 connected to the comparator circuit 4, a feedback circuit (including the parallel-connected resistor R1 and capacitor C) inserted between the output terminal 15 and the inverting input of the operational amplifier OP, and a diode D1 for clamping the output of the operational amplifier OP in response to a positive input.

The operation of the knocking decision level generator circuit 3 having the above-mentioned construction will be described. In FIG. 3, in the case where the output of the filter 2 applied to the input terminal 14 is negative, a positive output is generated from the operational amplifier OP and therefore the diode D2 conducts, thus charging the capacitor C in the polarity shown. In the case where the output of the filter 2 applied to the input terminal 14 is positive, on the other hand, a negative output is generated from the operational amplifier OP so that the diode D2 is cut off, thereby discharging the capacitor C through the resistor R1. In view of the fact that the time constant due to the resistor R1 and the capacitor C is set sufficiently longer than the period of the input signal, namely, the output of the filter 2, a DC voltage twice as high as the average value of the half wave rectification of the input signal (resistance value of resistor R1 as divided by the resistance value of resistor R2) is produced at the output terminal 15. This DC voltage is applied as a knocking decision level to the comparator circuit 4.

The general operation of the ignition timing control system using the knocking decision level generator circuit 3 as shown in FIG. 3 is the same as conventional systems. The knocking elements such as vibrations and noises caused by the knocking of the internal combustion engine are detected by the knocking sensor 1, and among the outputs of the knocking sensor 1, the knocking frequency band components are selectively applied through the filter 2 to the input of the knocking decision level generator circuit 3 and one of the inputs of the comparator circuit 4. The knocking decision level generator circuit 3 half-wave rectifies, integrates and amplifies the output of the filter 2, so that a DC output providing a knocking decision level is applied to the other input terminal of the comparator circuit 4. The comparator circuit 4 compares the output of the filter 2 with the knocking decision level. When the output of the filter 2 is larger than the knocking decision level, it is decided that a knocking has occurred and an output is produced from the ignition timing control circuit 9 in order to retard the ignition timing by a predetermined angle.

When the output of the filter 2 is smaller than the knocking decision level, on the other hand, a decision is made that no knocking has occurred, and an output is produced from the ignition timing control circuit 9 in order to advance the ignition timing by a predetermined angle. Thus the ignition timing is subjected to feedback control to prevent a knocking.

In the aforementioned embodiment, a knocking decision level is generated from the knocking decision level generator circuit 3 in accordance with the average value of the negative cycle of the input signal thereof. As an alternative, the polarities of the diodes D1 and D2 may be changed with equal effect so that a knocking decision level may be generated in accordance with the average value of the positive cycle of the input signal.

Also, when the input impedance of the comparator circuit 4 is low, an impedance converter circuit is preferably inserted between the output terminal 15 and the comparator 4.

According to the present invention described above, a rectifier element is connected to the output of an operational amplifier impressed with the output of the knocking sensor at the inverting input terminal thereof. A feedback circuit including a capacitor and a resistor in parallel is inserted between the output of the rectifier element and the reversed input of the operational amplifier thereby to make up a knocking decision level generator circuit. The DC output produced at the output terminal of the rectifier element, which is the result of half-wave rectification, integration and amplification of the output of the knocking sensor, is applied as a knocking decision level to the knocking decision circuit. In this way, the number of operational amplifiers which often causes such errors as temperature drift and offset is reduced. As a result, an ignition timing control system is realized having the great advantages of a circuit configuration simpler than conventional systems and a more accurate knocking decision level, thus making possible more precise ignition timing control according to knockings.

We claim:

1. In an ignition timing control system for an internal combustion engine including a knocking sensor for detecting knocking elements such as vibrations and noises caused by the knocking of the internal combustion engine, a knocking decision circuit for making a decision on a knocking by comparing an output of said knocking sensor with a knocking decision level, and an ignition timing control circuit for controlling the ignition timing in accordance with the output of said knocking decision circuit, the improvement comprising a knocking decision level generator circuit including:

an operational amplifier with an inverting input thereof supplied with an output of said knocking sensor;

a rectifier element serially connected between the output of said operational amplifier and said knocking decision circuit; and a feedback circuit including a parallel circuit having a capacitor and a resistor, said feedback circuit being inserted between the output of said rectifier element and the inverting input of said operational amplifier, said parallel circuit having a time constant sufficiently longer than the period corresponding to the knock frequency, whereby the output of said knocking sensor being half-wave rectified, integrated and amplified thereby to apply a DC output of said rectifier element to said knocking decision circuit as said knocking decision level.

2. An ignition timing control system for an internal combustion engine including a knock sensor for detecting knocks of the engine, a filter for selectively passing knock components of the output signal from the knock sensor, a knocking reference level generator circuit responsive to the filtered output of the filter for generating a knocking reference level signal, a comparator circuit for comparing the filtered output of the filter with the knocking reference level of the knocking generator to provide a decision signal indicative of the occurrence of knocks of the engine, and an ignition timing control circuit for controlling an ignition timing of the engine in accordance with the decision signal of the comparator, in which said knocking reference level generator circuit comprises:

an operational amplifier having a non-inverting terminal grounded and an inverting terminal connected to the output of said filter through a resistor;

a first diode having an anode and a cathode electrode, said anode electrode being connected to the output terminal of said operational amplifier;

a parallel circuit consisting of a capacitor and a resistor and connected between the cathode electrode of said first diode and the inverting terminal of said operational amplifier, a time constant of said parallel circuit being defined to have a predetermined time interval longer enough than the time period of the filtered signal of said filter; and a second diode having an anode and a cathode electrode, the anode electrode thereof being connected to the inverting terminal of said operational amplifier and the cathode electrode thereof being connected to the output terminal of said operational amplifier.

3. The improvement according to claim 1, wherein said rectifier element has an anode and a cathode, the anode being connected to the output of said operational amplifier and the cathode acting to feedback the output of said operational amplifier.

4. The improvement according to claim 1 or 3, wherein a noninverting input of said operational amplifier is operatively connected to the ground, and wherein an input resistor is connected between the knocking sensor and the inverting input of said operational amplifier.

* * * * *